(12) United States Patent
Zhang et al.

(10) Patent No.: US 11,335,018 B1
(45) Date of Patent: May 17, 2022

(54) VOLUMETRIC MEASURING METHOD AND APPARATUS BASED ON TIME-OF-FLIGHT DEPTH CAMERA

(71) Applicants: Weihai Innovation Institute, Qingdao University, Weihai (CN); QINGDAO UNIVERSITY, Qingdao (CN); Qingdao Point Cloud Intelligent Technology Co., Ltd., Qingdao (CN)

(72) Inventors: Weizhong Zhang, Weihai (CN); Zenghui Liu, Qingdao (CN); Chi Zhang, Qingdao (CN); Hongfeng Zhang, Qingdao (CN); Cuimei Yuan, Qingdao (CN); Yongpan Li, Qingdao (CN); Tianyu Chen, Qingdao (CN)

(73) Assignee: WEIHAI INNOVATION INSTITUTE, QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 17/571,400

(22) Filed: Jan. 7, 2022

(30) Foreign Application Priority Data

Jan. 14, 2021 (CN) .......................... 202110046765.9

(51) Int. Cl.
*G06T 7/521* (2017.01)
*G06T 5/30* (2006.01)
(Continued)

(52) U.S. Cl.
CPC .............. *G06T 7/521* (2017.01); *G06T 5/002* (2013.01); *G06T 5/30* (2013.01); *G06T 7/238* (2017.01);
(Continued)

(58) Field of Classification Search
CPC ..... G06T 7/20–292; G06T 2207/10028; G06T 7/50–596; G06T 2207/20036; G06T 5/002
See application file for complete search history.

(56) References Cited

U.S. PATENT DOCUMENTS 6,992,756 B1 * 1/2006 Chang ....................... G01P 3/36
356/28
10,282,902 B1 * 5/2019 Mishra .................... G06T 17/20
(Continued)

FOREIGN PATENT DOCUMENTS

CN    101514993 A    8/2009
CN    103983188 A    8/2014
(Continued)

OTHER PUBLICATIONS

Bortnowski, Piotr, et al. "Tests of belt linear speed for identification of frictional contact phenomena." Sensors 20.20 (2020): 5816. (Year: 2020).*
(Continued)

*Primary Examiner* — Geoffrey E Summers
(74) *Attorney, Agent, or Firm* — J.C. Patents

(57) ABSTRACT

The present application provides a volumetric measuring method and apparatus based on a TOF depth camera, which is achieved by: acquiring depth images; denoising the depth images; selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values; determining a traversal speed corresponding to a maximum total similarity value as an instantaneous speed at a current moment; calculating a
(Continued)

package volume according to the instantaneous speed. The present application effectively solves the problem that an accurate package volume cannot be obtained when a speed of the conveyor belt is not fixed, and high in feasibility.

11 Claims, 5 Drawing Sheets

(51) Int. Cl.
    *G06T 5/00*     (2006.01)
    *G06T 7/238*     (2017.01)
    *G06T 7/536*     (2017.01)

(52) U.S. Cl.
    CPC .... *G06T 7/536* (2017.01); *G06T 2207/10028* (2013.01); *G06T 2207/20036* (2013.01)

(56) References Cited

U.S. PATENT DOCUMENTS

| | | | |
|---|---|---|---|
| 2013/0058539 A1* | 3/2013 | Mori | G06T 7/62 382/106 |
| 2018/0029839 A1* | 2/2018 | Chen | B66B 25/006 |
| 2021/0262780 A1* | 8/2021 | Gao | G01S 7/481 |

FOREIGN PATENT DOCUMENTS

| | | |
|---|---|---|
| CN | 105488816 A | 4/2016 |
| CN | 105841614 A | 8/2016 |
| CN | 106524917 A | 3/2017 |
| CN | 106767399 A | 5/2017 |
| CN | 109059770 A | 12/2018 |
| CN | 110782473 A | 2/2020 |
| CN | 111291654 A | 6/2020 |
| CN | 111561872 A | 8/2020 |
| CN | 111986250 A | 11/2020 |
| DE | 102012220648 A1 | 5/2014 |

OTHER PUBLICATIONS

Garduño-Ramón, Marco Antonio, et al. "A new method for inpainting of depth maps from time-of-flight sensors based on a modified closing by reconstruction algorithm." Journal of Visual Communication and Image Representation 47 (2017): 36-47. (Year: 2017).*
Luo, Ren C., and Robert E. Mullen Jr. "A modifed optical flow approach for robotic tracking and acquisition." Journal of robotic systems 6.5 (1989): 489-508. (Year: 1989).*
Gao, Yuan, et al. "A contactless measuring speed system of belt conveyor based on optical flow techniques." IEEE Access 7 (2019): 121646-121654. (Year: 2019).*
Search Report of CN202110046765.9.
Supplementary Search Report of CN202110046765.9.

* cited by examiner

VOLUMETRIC MEASURING METHOD AND APPARATUS BASED ON TIME-OF-FLIGHT DEPTH CAMERA

This application claims the priority of Chinese patent application No. 202110046765.9, titled "Volumetric Measuring Method and Apparatus Based on TOF Depth Camera", filed on Jan. 14, 2021, the entire content of which is incorporated herein by reference.

TECHNICAL FIELD

The application belongs to the technical field of logistics, and particularly relates to a volumetric measuring method and apparatus based on a time-of-flight depth camera.

BACKGROUND ART

With the development of the level of economy, express delivery has become a mainstream of transportation. However, with the increasing demands of the people, more contradictions have appeared in the express delivery industry. At present, the main contradiction in the express delivery industry is that the service capacity and development level can not meet the economic and social development and the ever-increasing service demands of the people. Traditionally, the volume calculation of a package usually needs tools such as a tape measure for manual measurement. However, if the measurement process of the package is done manually, the efficiency is relatively low, the measurement tools are outdated, and measurement results are easy to cause disputes between both sides of the trade. With the increasing requirements of customers for logistics efficiency and cost settlement, this approach is increasingly unable to meet the requirements of modern logistics for high efficiency and accuracy.

In related technologies, the automatic calculation of the package volume by a flow volume calculation algorithm can free staff from heavy volumetric measuring work, so that the labor force is saved, the working efficiency of logistics enterprises is improved, thereby playing an important role in promoting the modernization of the logistics enterprises. However, the flow volume calculation algorithm needs to know the "flow" speed of the package in advance, that is, the movement speed of the package on a conveyor belt. If the speeds of all conveyor belts in an express company are consistent, it is only necessary to measure the speed of the conveyor belt and set speed variables in advance, so that the algorithm can run normally in theory; but, if the conveyor belt has various speeds, for example, the speed of the conveyor belt can be set manually or automatically adjusted according to the situations, such as time and the amounts of packages, it is difficult for a program to accurately calculate the package volume. However, the loading speed of loading staff is limited, especially during busy business periods such as "Double Eleven", packages are often piled up and parked on the conveyor belt, and the loading staff often load packages in a "stop-and-go" way of the conveyor belt. At this time, the speed is often in an unstable state in which it will be high or low abruptly, or the problem of speed change caused by voltage instability makes the algorithm unable to calculate the accurate package volume.

SUMMARY OF THE INVENTION

In view of the aforementioned problem, an object of the present application is to provide a volumetric measuring method and apparatus based on a time-of-flight depth camera.

In order to achieve the above object, the present application adopts following technical solutions.

A volumetric measuring method based on a time-of-flight depth camera provided by an embodiment of the present application, comprises:

acquiring depth images returned by the time-of-flight depth camera; the depth images comprise a first depth image and a second depth image which are adjacent to each other;

denoising the first depth image and the second depth image;

selecting a first feature area of the first depth image and a second feature area of the second depth image that have been denoised respectively, traversing each pixel point in the first feature area at multiple traversal speeds v, and matching a first depth value of a current pixel point with a second depth value of a target pixel point corresponding to the current pixel point in the second feature area to acquire multiple total similarity values;

determining a traversal speed corresponding to a maximum total similarity value among the multiple total similarity values as an instantaneous speed at a current moment;

calculating a package volume according to the instantaneous speed.

In some embodiments, the "acquiring depth images returned by the time-of-flight depth camera" comprises:

acquiring depth flows by employing the time-of-flight depth camera to shoot a package on a conveyor belt;

converting the depth flows into the depth images;

wherein, the time-of-flight depth camera is arranged above the conveyor belt, and a shooting direction of the time-of-flight depth camera is perpendicular to the conveyor belt.

In some embodiments, the "denoising the first depth image and the second depth image" comprises:

performing morphological processing on the first depth image and the second depth image;

the morphological processing comprises denoising the first depth image and the second depth image by image erosion and filtering.

In some embodiments, the "traversing each pixel point in the first feature area at multiple traversal speeds" comprises:

acquiring a time difference between the first depth image and the second depth image, and calculating a traveling distance of the conveyor belt according to the time difference and the preset initial traversal speed;

calculating a value of a vertical height between a first position represented by the current pixel point and a camera mirror of the time-of-flight depth camera according to the first depth value of the current pixel point, and calculating an actual distance represented by each pixel point under the vertical height of the current pixel point according to the value of the vertical height and a half-viewing angle of the time-of-flight depth camera along a direction of the conveyor belt;

calculating a number of pixel points that the current pixel point should advance in the second depth image after the time difference according to the traveling distance and the actual distance;

selecting the current pixel point and eight pixel points around the current pixel point, and finding the target pixel point corresponding to the current pixel point and eight pixel points around the target pixel point in the second depth image according to the number of the pixel points.

In some embodiments, the "traversing each pixel point in the first feature area at multiple traversal speeds" comprises following specific steps:

1) acquiring the time difference t between the first depth image and the second depth image;

2) setting a traversal speed v from $V_1$ to $V_2$, and a traversal accuracy as r, that is, each traversal increases v by r, when traversing at the traversal speed v:

(1) according to the traversal speed v, calculating the traveling distance x of the conveyor belt based on x=v*t;

(2) given a size of each depth image, traversing each pixel point in the first feature area of the first depth image, and when traversing each pixel point:

calculating the vertical height h between the first position represented by the current pixel point and the camera mirror of the time-of-flight depth camera according to depth information of the current pixel point p, and calculating the actual distance represented by each pixel point under the vertical height of the current pixel point according to the half-viewing angle γ of the time-of-flight depth camera along the direction of the conveyor belt:

$$L=(h*\tan(\gamma)*2)/n;$$

where: L is the actual distance represented by each pixel point; h is the vertical height between the first position represented by the current pixel point and the camera mirror; γ is the half-viewing angle; n is the number of pixel points;

calculating, according to the traversal speed v, the number of pixel points Δn=x/L that the pixel point p should advance in the second depth image over t time;

taking the current pixel point and the eight pixel points around the current pixel point, and finding the target pixel point pp corresponding to the current pixel point p and the eight pixel points around the target pixel point pp in the second depth image according to Δn obtained by the current pixel point p.

In some embodiments, the "matching a first depth value of a current pixel point with a second depth value of a target pixel point corresponding to the current pixel point in the second feature area to acquire multiple total similarity values" comprises:

matching the first depth value of the current pixel point with the second depth value of the target pixel point;

if an absolute value of a difference between the first depth value and the second depth value is greater than or equal to a first preset threshold, the current pixel point matching fails; if a first height of the first position represented by the current pixel point that fails to match is higher than a second height of a second position represented by the target pixel point, acquiring a single pixel similarity value of the current pixel point, and adding the single pixel similarity value to a total similarity value; otherwise, do nothing;

if the absolute value of the difference between the first depth value and the second depth value is less than the first preset threshold, the current pixel point is successfully matched, perform a weighting process to obtain a single pixel similarity value, and adding the single pixel similarity value to the total similarity value.

In some embodiments, the weighting process comprises:

judging whether the first position represented by the current pixel point is on the package according to a value of the first height of the current pixel point;

if the first position is not on the package, assigning a first weight value;

if the first position is on the package, judging whether the first position represented by the current pixel point and the second position represented by the target pixel point are both on edges of the package by a variance of depth values of the eight pixels around the current pixel point and a variance of depth values of the eight pixels around the target pixel point, respectively;

if any one of the first position and the second position is not on the edges of the package, assigning the first weight value;

if both of the first position and the second position are on the edges of the package, comparing the eight pixel points around the current pixel point and the eight pixel points around the target pixel point correspondingly, wherein when an absolute value of a difference between any pair of eight pairs of pixel points is less than a second preset threshold, this pair of pixel points is successfully matched, and counting a number of successfully matched pairs among the eight pairs of pixel points; setting a first threshold and a second threshold;

when the number of successfully matched pairs is less than or equal to the first threshold, assigning the first weight value;

when the number of successfully matched pairs is greater than the first threshold and less than or equal to the second threshold, assigning a second weight value;

when the number of successfully matched pairs is greater than the second threshold, assigning a third weight value.

In some embodiments, the first threshold is smaller than the second threshold; the first weight value is smaller than the second weight value, and the second weight value is smaller than the third weight value.

A volumetric measuring apparatus based on a time-of-flight depth camera provided by an embodiment of the present application, comprises:

an acquisition module for acquiring depth images returned by the time-of-flight depth camera; the depth images comprise a first depth image and a second depth image which are adjacent to each other;

a processing module for denoising the first depth image and the second depth image;

a matching module for selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

a determination module for determining a traversal speed corresponding to a maximum total similarity value among the multiple total similarity values as an instantaneous speed at a current moment;

a calculation module for calculating a package volume according to the instantaneous speed.

In some embodiments, the matching module comprises:

a first calculation unit for acquiring a time difference between the first depth image and the second depth image, and calculating a traveling distance of the conveyor belt according to the time difference and a preset initial traversal speed;

a second calculation unit for calculating a value of a vertical height between a first position represented by the current pixel point and a camera mirror of the time-of-flight depth camera according to the first depth value of the current pixel point, and calculating an actual distance represented by each pixel under the vertical height of the current pixel point according to the value of the vertical height and a half-viewing angle of the time-of-flight depth camera along a direction of the conveyor belt;

a third calculation unit for calculating a number of pixel points that the current pixel point should advance in the second depth image after the time difference according to the traveling distance and the actual distance;

a selection unit for selecting the current pixel point and eight pixel points around the current pixel point, and finding the target pixel point corresponding to the current pixel point and eight pixel points around the target pixel point in the second depth image according to the number of the pixel points.

a matching unit for matching the first depth value of the current pixel point with the second depth value of the target pixel point;

a first weighting unit for, if an absolute value of a difference between the first depth value and the second depth value is greater than or equal to a first preset threshold, the current pixel point matching fails and if a first height of the first position represented by the current pixel point that fails to match is higher than a second height of a second position represented by the target pixel point, acquiring a single pixel similarity value of the current pixel point, and adding the single pixel similarity value to the total similarity value.

a second weighting unit for, if the absolute value of the difference between the first depth value and the second depth value is less than the first preset threshold, the current pixel point is successfully matched, perform a weighting process to obtain a single pixel similarity value, and adding the single pixel similarity value to the total similarity value.

A computer device provided by an embodiment of the present application, comprises a processor and a memory connected with the processor;

the memory is configured to store a computer program which is to execute the volumetric measuring method according to any one of the aforementioned embodiments;

the processor is configured to call and execute the computer program in the memory.

The present application provides a volumetric measuring method and apparatus based on a TOF depth camera, which is achieved by: acquiring depth images returned by the TOF depth camera; denoising the first depth image and the second depth image; selecting a first feature area of the first depth image and a second feature area of the second depth image that have been denoised respectively, traversing each pixel point in the first feature area at multiple traversal speeds, and matching a first depth value of the current pixel point with a second depth value of a target pixel point corresponding to the current pixel point in the second feature area to acquire multiple total similarity values; determining a traversal speed corresponding to a maximum total similarity value among the multiple total similarity values as an instantaneous speed at a current moment; calculating a package volume according to the instantaneous speed. The present application effectively solves the problem that an accurate package volume cannot be obtained when the speed of the conveyor belt is not fixed due to turning-on, turning-off, unstable voltage, manual intervention and the like, and can make the package volume calculation more accurate, and the method is accurate and effective in measurement, and high in feasibility.

The present application achieves the effects that there is no need to measure or set the speed of the conveyor belt in advance and an instantaneous speed can be accurately acquired when the speed of the conveyor belt is not fixed so as to calculate the package volume on the conveyor belt, and package volume calculation can be more accurate, so that the requirements of modern logistics for high efficiency and accuracy are met, and a great significance is brought to the process optimization and decision-making process of logistics enterprises.

BRIEF DESCRIPTION OF THE DRAWINGS

In order to explain the embodiments of the present application, the following will make a brief introduction to the figures that are used in the description of the embodiments. Obviously, the figures in the following description are only some of embodiments of the present application, and for those of ordinary skill in the art, other figures can also be derived from these figures without creative labor.

DETAILED DESCRIPTION OF THE INVENTION

In order to make objects, technical solutions and advantages of the present application clearer, technical solutions of the present application will be described in detail below. Apparently, the described embodiments are merely some, but not all, of the embodiments of the present application. Based on the embodiments in the present application, all other embodiments obtained by those of ordinary skill in the art without creative labor are within the scope of protection of the present application.

Next, a specific volumetric measuring method and apparatus based on a time-of-flight (referred as TOF in the present application for simplify) depth camera provided in an embodiment of the present application will be introduced with the accompanying drawings below.

The TOF depth camera obtains a distance between a target object and the TOF depth camera by continuously sending light pulses to the target object, then receiving light returned from the target object with a sensor, and detecting time of flight of the light pulses. The present application can be realized by employing the currently existing TOF depth camera.

Figure 1:
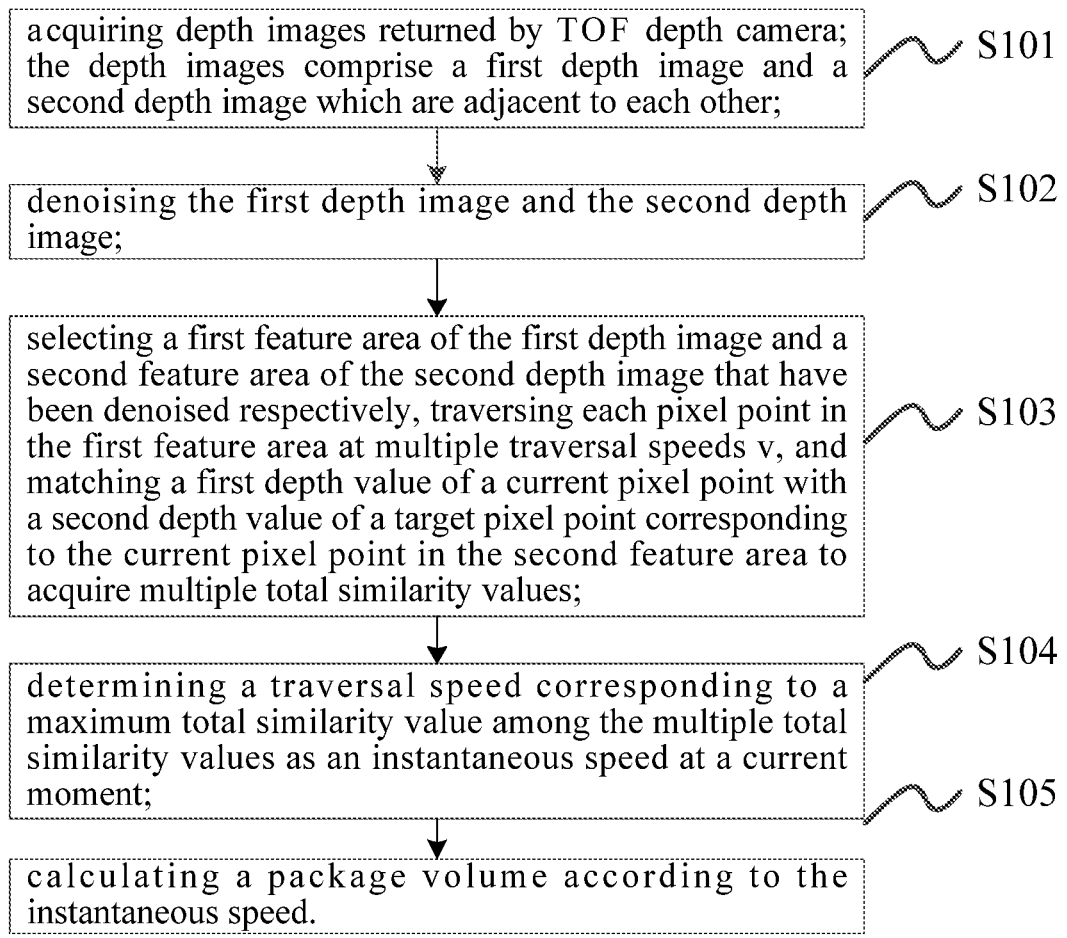
FIG. 1 is a schematic diagram of steps of a volumetric measuring method based on a TOF depth camera in an embodiment of the present application.

As shown in FIG. 1, a volumetric measuring method based on a TOF depth camera provided in an embodiment of the present application comprises:

S101, acquiring depth images returned by the TOF depth camera; the depth images comprise a first depth image and a second depth image which are adjacent to each other;

specifically, the "acquiring depth images returned by the TOF depth camera" comprises:

acquiring depth flows by employing the TOF depth camera to shoot a package on a conveyor belt;

converting the depth flows into the depth images;

wherein, the TOF depth camera is arranged above the conveyor belt, and a shooting direction of the TOF depth camera is perpendicular to the conveyor belt.

It can be understood that a data processing control module in the TOF depth camera controls turning-on and turning-off of the TOF depth camera, and converts the depth flows acquired by the TOF depth camera after shooting the package on the conveyor belt into the depth images. The method of converting the depth flows into the depth images mentioned above is common knowledge to a person skilled in the art, and is omitted here.

S102, denoising the first depth image and the second depth image;

s optionally, the "denoising the first depth image and the second depth image" comprises:

performing morphological processing on the first depth image and the second depth image;

the morphological processing comprises denoising the first depth image and the second depth image by image erosion and filtering. This denoising method is the existing technology in the art and is omitted here.

S103, selecting a first feature area of the first depth image and a second feature area of the second depth image that have been denoised respectively, traversing each pixel point in the first feature area at multiple traversal speeds v, and matching a first depth value of a current pixel point with a second depth value of a target pixel point corresponding to the current pixel point in the second feature area to acquire multiple total similarity values;

specifically, selecting an area of interest of the denoised first depth image as the first feature area; selecting an area of interest of the denoised second depth image as the second feature area.

Where, the area of interest is selected according to routine operation of a person skilled in the art; generally speaking, it is preferable to select an area near an object entry position on a target object as the area of interest, so that a situation that the area of interest from falling out of the field of view of the TOF depth camera in the second depth image can be prevented. Selecting the second feature area of the second depth image actually means that the second feature area is obtained by speed traversal on the first feature area of the first depth image.

It can be understood that a preset initial speed $v_0$ and a traversal accuracy r are preset, that is, each traversal increases v by r, and traversal at multiple traversal speeds is performed; for each speed v, after traversing the first feature area of the first depth image, a total similarity value will be obtained. Therefore, for multiple traversal speeds, multiple total similarity values can be obtained.

Where, the preset initial speed $v_0$ and the traversal accuracy r are determined according to a speed of the conveyor belt and a required accuracy, and after traversing multiple traversal accuracies r, a maximum traversal speed $v_{max}$ is equal to the speed of the conveyor belt. For example, when the speed of the conveyor belt is 0.5 m/s, the following may be set: the preset initial speed $v_0$=0 m/s, the traversal accuracy r=0.1 m/s, each pixel point traverses five speeds, and the maximum traversal speed $v_{max}$=the speed of the conveyor belt=0.5 m/s.

S104, determining a traversal speed corresponding to a maximum total similarity value among the multiple total similarity values as an instantaneous speed at a current moment;

After traversing all the traversal speeds, several total similarity values will be obtained, and the traversal speed corresponding to the maximum total similarity value is taken as the instantaneous speed at the current moment, the instantaneous speed actually being an average speed in the time between two adjacent frames currently.

S105, calculating a package volume according to the instantaneous speed.

After the instantaneous speed is determined, the package volume is calculated by a flow volume calculation algorithm. Where, after the instantaneous speed is determined, the instantaneous speed is taken as a fixed speed, and the package volume is calculated by the flow volume calculation algorithm based on the fixed speed, the flow volume calculation algorithm has been disclosed in the related art (CN109059770A) and will be omitted herein.

When adopting the volumetric measuring method based on the TOF depth camera provided by the embodiment of the present application, there is no need to set the speed of the conveyor belt in advance, which makes the algorithm more general; and the problem that the speed of the conveyor belt changes due to turning-on, turning-off, unstable voltage, manual intervention, etc. can be solved, so that the flow volume calculation algorithm is no longer limited by the constant speed, and the volume calculation is more accurate. The requirements of modern logistics for high efficiency and accuracy are met, and a great significance is brought to the process optimization and decision-making process of logistics enterprises.

Optionally, the "traversing each pixel point in the first feature area at multiple traversal speeds" comprises:

acquiring a time difference between the first depth image and the second depth image, and calculating a traveling distance of the conveyor belt according to the time difference and the preset initial traversal speed;

calculating a value of a vertical height between a first position represented by the current pixel point and a camera mirror of the TOF depth camera according to the first depth value of the current pixel point, and calculating an actual distance represented by each pixel point under the vertical height of the current pixel point according to the value of the vertical height and a half-viewing angle of the TOF depth camera along a direction of the conveyor belt;

calculating a number of pixel points that the current pixel point should advance in the second depth image after the time difference according to the traveling distance and the actual distance;

selecting the current pixel point and eight pixel points around the current pixel point, and finding the target pixel point corresponding to the current pixel point and eight pixel points around the target pixel point in the second depth image according to the number of the pixel points.

Figure 2:
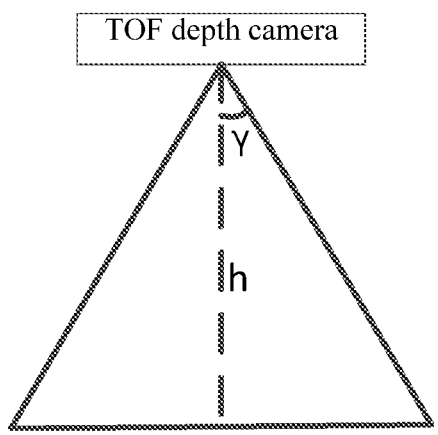
FIG. 2 is a schematic diagram of a viewing angle of the TOF depth camera in an embodiment of the present application.

Specifically, the "traversing each pixel point in the first feature area at multiple traversal speeds" comprises the following specific steps:

1) acquiring the time difference t between the first depth image and the second depth image;

2) setting a traversal speed v from $V_1$ to $V_2$, and the traversal accuracy as r, that is, each traversal increases v by r, when traversing at the traversal speed:

(1) according to the traversal speed v, the traveling distance of the conveyor belt is solved based on x=v*t;

(2) given a size of each image, every pixel point p of the first feature area of the first depth image is traversed, and when traversing the pixel point:

calculating the vertical height h between the first position represented by the current pixel point and the camera mirror of the TOF depth camera according to depth information of the current pixel point p, and calculating the actual distance represented by each pixel point under the vertical height of the current pixel point according to the half-viewing angle γ (as shown in FIG. 2) of the TOF depth camera along the direction of the conveyor belt (corresponding to a direction in which the number of pixel points is n):

$$L=(h*\tan(\gamma)*2)/n;$$

where: L is the actual distance represented by each pixel point; h is the vertical height between the first position represented by the current pixel point and the camera mirror; γ is the half-viewing angle; n is the number of pixel points;

calculating, according to the traversal speed v, the number of pixel points that the pixel point p should advance in the second depth image over t time: $\Delta n = x/L$;

taking the current pixel point and the eight pixel points around the current pixel point, and finding the target pixel point pp corresponding to the current pixel point p and the eight pixel points around the target pixel point pp in the second depth image according to Δn obtained by the current pixel point p.

Through the above steps, the target pixel point pp corresponding to the current pixel point p is found in the second depth image and subsequent depth value matching is carried out.

The working principle of the volumetric measuring method based on the TOF depth camera provided by the present application is as follows: acquiring two adjacent depth images returned, installing the TOF depth camera directly above the conveyor belt, with a shooting direction being perpendicular to the conveyor belt, acquiring depth flows by shooting by the TOF depth camera, and converting the acquired depth flows into the depth images; denoising the depth images, that is, performing morphological processing on the depth images, and denoising the depth images through image erosion and filtering; selecting a first feature area of the denoised first depth image and a second feature area of the denoised second depth image respectively, traversing each pixel point in the first feature area at multiple traversal speeds, and matching a first depth value of a current pixel point with a second depth value of a target pixel point corresponding to the current pixel point in the second feature area to acquire multiple total similarity values; determining a traversal speed corresponding to the maximum total similarity value among the total similarity values as an instantaneous speed at the current moment, so as to determine an optimal instantaneous speed; and finally, calculating a package volume by the flow volume calculation algorithm with the optimal instantaneous speed.

Optionally, the "matching a first depth value of a current pixel point with a second depth value of a target pixel point corresponding to the current pixel point in the second feature area to acquire multiple total similarity values" in S103, comprises:

matching the first depth value of the current pixel point with the second depth value of the target pixel point;

if an absolute value of a difference between the first depth value and the second depth value is greater than or equal to a first preset threshold, the current pixel point matching fails; if a first height of the first position represented by the current pixel point that fails to match is higher than a second height of a second position represented by the target pixel point, acquiring a single pixel similarity value of the current pixel point, and adding the single pixel similarity value to the total similarity value; otherwise, do nothing;

if the absolute value of the difference between the first depth value and the second depth value is less than the first preset threshold, the current pixel point is successfully matched, perform a weighting process to obtain a single pixel similarity value, and adding the single pixel similarity value to the total similarity value.

It can be understood that a value of the preset threshold is determined according to an error acceptable by a person skilled in the art, and the value may be different in different situations, which will not be limited in the present application.

According to the method provided by the present application, a matching degree of speed is measured by adding the single pixel similarity value to the total similarity value, the total similarity value indicates a similarity between a simulated speed and a real speed, and the simulated speed corresponding to the maximum total similarity value will be regarded as a current real speed. The first depth value of the current pixel point p and the second depth value of the target pixel point pp are compared, if the absolute value of the difference is greater than or equal to the first preset threshold $\delta_1$, the current pixel point matching fails; when the current pixel point matching fails, if the first height of the first position represented by the current pixel point is greater than the second height of the second position represented by the target pixel point, the single pixel similarity value of the current pixel point is obtained; it should be noted that in this case, the single pixel similarity value is set as a negative value when weighting and added to the total similarity value, that is, the single pixel similarity value of the current pixel point that fails to match will play a role in reducing the total similarity value when added to the total similarity value. When the package moves, it can be known from the calculation formula of Δn that a pixel point corresponding to a high position moves faster in the area of interest than that corresponding to a low position, resulting in that the pixel point corresponding to the high position in the image may cover the pixel point corresponding to the original low position in the next frame image. Therefore, when the current pixel point matching fails, if the first height of the first position represented by the first depth value of the current pixel point p is less than the second height of the second position represented by the second depth value of the target pixel point pp, no reduction treatment in the total similarity value is performed for this situation. If the absolute value of the difference is less than the first preset threshold $\delta_1$, the current pixel point is matched successfully, and after the difference is weighted, the single pixel similarity value is obtained and added to the total similarity value.

In some embodiments, the weighting process comprises:

judging whether the first position represented by the current pixel point is on the package according to a value of the first height of the current pixel point;

if it is not on the package, assigning a first weight value, denoted as $q_1$;

if it is on the package, judging whether the first position represented by the current pixel point and the second position represented by the target pixel point are both on edges of the package by a variance of depth values of the eight pixels around the current pixel point and a variance of depth values of the eight pixels around the target pixel point, respectively;

if any one of the first position and the second position is not on the edges of the package, assigning the first weight value $q_1$;

if both of the first position and the second position are on the edges of the package, comparing the eight pixel points around the current pixel point and the eight pixel points around the target pixel point correspondingly, wherein when an absolute value of a difference between any pair of pixel points is less than a second preset threshold, this pair of pixel points is successfully matched, and a number of successfully matched pairs among eight pairs of pixel points is counted; setting a first threshold flu and a second threshold $\beta_2$;

when the number of successfully matched pairs is less than or equal to the first threshold $\beta_1$, assigning the first weight value $q_1$;

when the number of successfully matched pairs is greater than the first threshold $\beta_1$ and less than or equal to the second threshold $\beta_2$, assigning a second weight value, denoted as $q_2$;

when the number of successfully matched pairs is greater than the second threshold $\beta_2$, assigning a third weight value, denoted as $q_3$.

Optionally, the first weight value $q_1$ is smaller than the second weight value $q_2$, and the second weight value $q_2$ is smaller than the third weight value $q_3$, that is, $q_1 < q_2 < q_3$; it can be understood that when both of the current pixel point and the target pixel point are on the edges of the package, the eight pixel points around the current pixel point and the eight pixel points around the target pixel point are compared correspondingly, and when the absolute value of the difference between any pair of pixel points is less than the second preset threshold, it means that this pair of pixel points is successfully matched; the number of the successfully matched pairs among the eight pairs of pixel points is counted, the more the successfully matched pairs, the greater the weight value set correspondingly.

Figure 3:
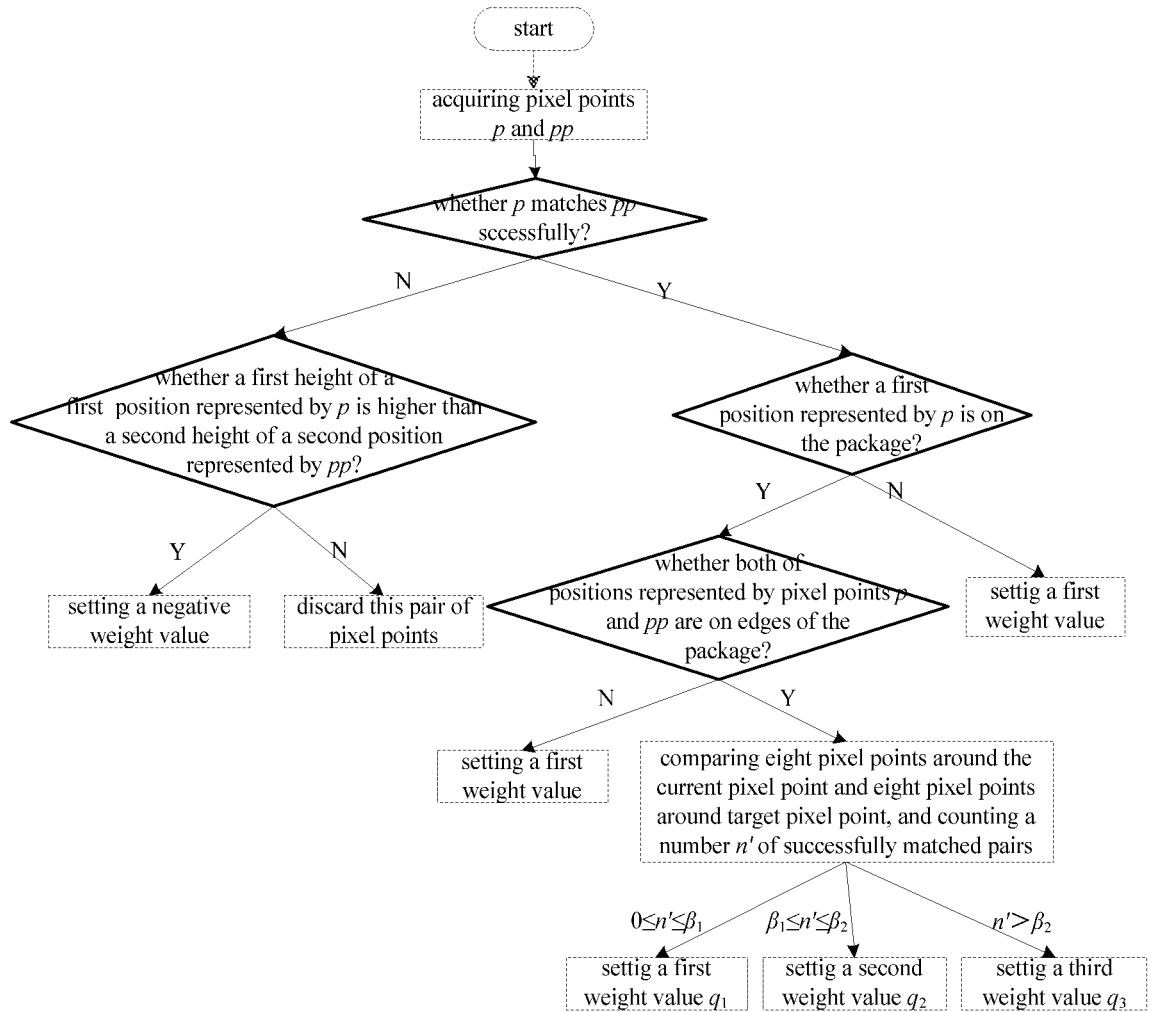
FIG. 3 is a flow diagram of weighting processing in an embodiment of the present application.

Specifically, as shown in FIG. 3, specific steps of the weighting process are as follows:

1) if the first position is not on the package, setting a weight value as the $q_1$, that is, no weighting is performed;

2) if the first position is on the package, judging whether the first position represented by the current pixel point p and the second position represented by the target pixel point pp are both on the edges of the package by the variance of the depth values of the eight pixels around the current pixel point and the variance of the depth values of the eight pixels around the target pixel point, respectively:

a. if not both are on the edges of the package, that is, one of them is not on the edges of the package, setting a weight value as the $q_1$, that is, no weighting is performed;

b. if they are both on the edges of the package, the eight pixel points around the current pixel point p and the eight pixel points around the target pixel point pp are correspondingly compared, and when the absolute value of the difference between any pair of pixel points is less than the second preset threshold $\delta_2$, this pair of pixel points is successfully matched; the number n' of successfully matched pairs among the eight pairs of pixel points is counted, and setting two thresholds $\beta_1$, $\beta_2$:

when $0 \leq n' \beta_1$, setting the weight value as the $q_1$;
when $\beta_1 < n' \leq \beta_2$, setting the weight value as the $q_2$;
when $n' > \beta_2$, setting the weight value as the $q_3$.

It can be understood that $0 < \beta_1 < \beta_2$, where $\beta_2$ can be a multiple of $\beta_1$, and the number of successfully matched pairs can be judged by setting $\beta_1$, $\beta_2$, so as to set corresponding weight values.

Figure 4:
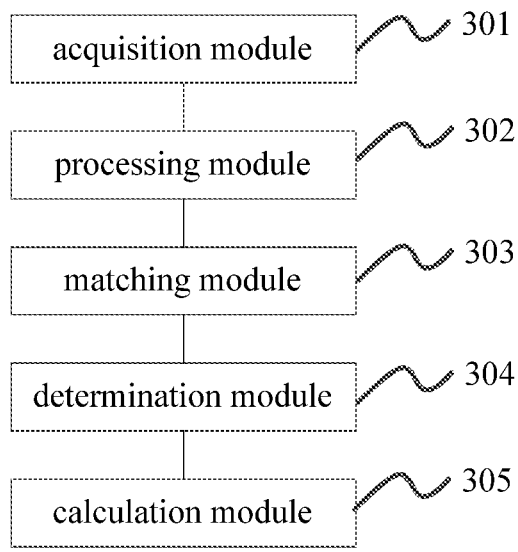
FIG. 4 is a schematic structural diagram of a volumetric measuring apparatus based on the TOF depth camera in an embodiment of the present application.

As shown in FIG. 4, an embodiment of the present application provides a volumetric measuring apparatus based on the TOF depth camera, comprises:

an acquisition module 301 for acquiring depth images returned by the TOF depth camera; the depth images comprise a first depth image and a second depth image which are adjacent to each other;

a processing module 302 for denoising the first depth image and the second depth image;

a matching module 303 for selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

a determination module 304 for determining a traversal speed corresponding to a maximum total similarity value among the multiple total similarity values as an instantaneous speed at a current moment;

a calculation module 305 for calculating a package volume according to the instantaneous speed.

Figure 5:
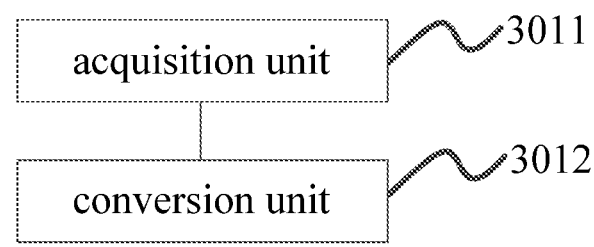
FIG. 5 is a schematic structural diagram of an acquisition module provided by an embodiment of the present application.

Optionally, as shown in FIG. 5, the acquisition module 301 comprises:

an acquisition unit 3011 for acquiring depth flows by employing the TOF depth camera to shoot a package on a conveyor belt;

a conversion unit 3012 for converting the depth flows into the depth images.

Optionally, the processing module 302 comprises:

a processing unit for performing morphological processing on the first depth image and the second depth image;

the morphological processing comprises denoising the first depth image and the second depth image by image erosion and filtering.

Figure 6:
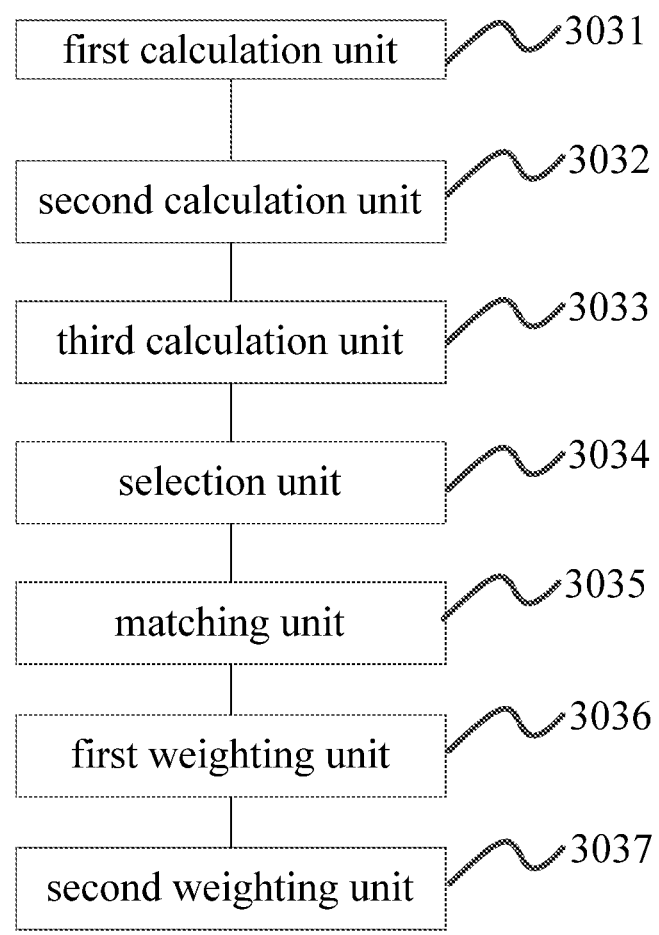
FIG. 6 is a schematic structural diagram of a matching module provided by an embodiment of the present application.

Optionally, as shown in FIG. 6, the matching module 303 comprises:

a first calculation unit 3031 for acquiring a time difference between the first depth image and the second depth image, and calculating a traveling distance of the conveyor belt according to the time difference and a preset initial traversal speed;

a second calculation unit 3032 for calculating a value of a vertical height between a first position represented by the current pixel point and a camera mirror of the TOF depth camera according to the first depth value of the current pixel point, and calculating an actual distance represented by each pixel under the vertical height of the current pixel point according to the value of the vertical height and a half-viewing angle of the TOF depth camera along a direction of the conveyor belt;

a third calculation unit 3033 for calculating a number of pixel points that the current pixel point should advance in the second depth image after the time difference according to the traveling distance and the actual distance;

a selection unit 3034 for selecting the current pixel point and eight pixel points around the current pixel point, and finding the target pixel point corresponding to the current pixel point and eight pixel points around the target pixel point in the second depth image according to the number of the pixel points.

Optionally, as shown in FIG. 6, the matching module 303 further comprises:

a matching unit 3035 for matching the first depth value of the current pixel point with the second depth value of the target pixel point;

a first weighting unit 3036 for, if an absolute value of a difference between the first depth value and the second depth value is greater than or equal to a first preset threshold, the current pixel point matching fails and if a first height of the first position represented by the current pixel point that fails to match is higher than a second height of a second position represented by the target pixel point, acquiring a single pixel similarity value of the current pixel point, and adding the single pixel similarity value to the total similarity value.

a second weighting unit 3037 for, if the absolute value of the difference between the first depth value and the second depth value is less than the first preset threshold, the current pixel point is successfully matched, perform a weighting process to obtain a single pixel similarity value, and adding the single pixel similarity value to the total similarity value.

Figure 7:
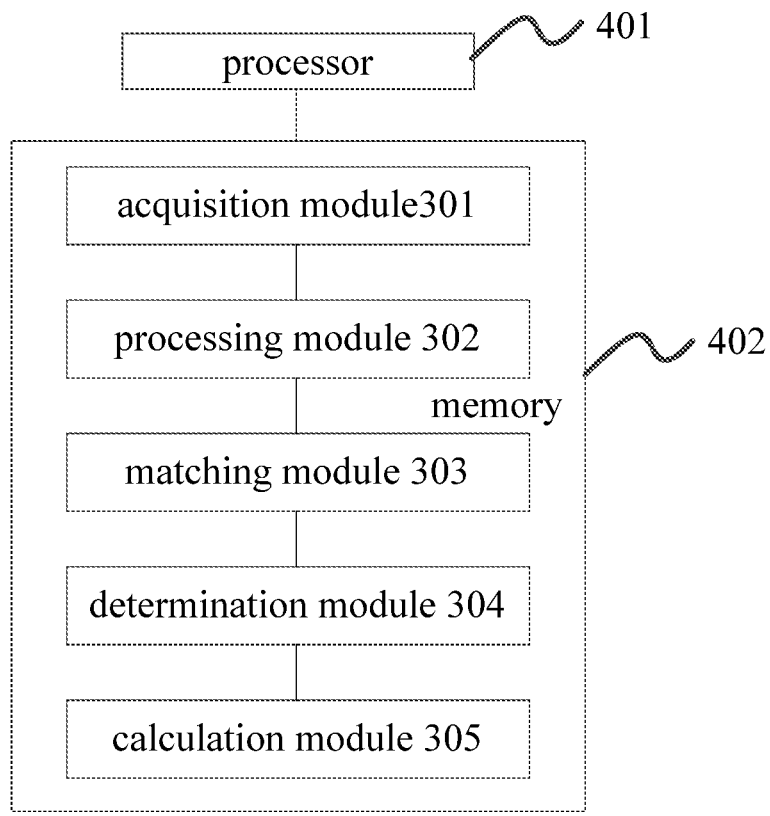
FIG. 7 is a schematic structural diagram of another embodiment of the volumetric measuring apparatus based on the TOF depth camera provided by the present application.

As shown in FIG. 7, another embodiment of the present application provides a volumetric measuring apparatus based on the TOF depth camera, which comprises a processor 401 and a memory 402 connected with the processor 401, wherein the processor 401 is configured to execute following program modules stored in the memory 402:

an acquisition module 301 for acquiring depth images returned by the TOF depth camera; the depth images comprises a first depth image and a second depth image which are adjacent to each other;

a processing module 302 for denoising the first depth image and the second depth image;

a matching module 303 for selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

a determination module 304 for determining a traversal speed corresponding to a maximum total similarity value among the multiple total similarity values as an instantaneous speed at a current moment;

a calculation module 305 for calculating a package volume according to the instantaneous speed.

Optionally, as shown in FIG. 5, the acquisition module 301 comprises:

an acquisition unit 3011 for acquiring depth flows by employing the TOF depth camera to shoot a package on a conveyor belt;

a conversion unit 3012 for converting the depth flows into the depth images.

Optionally, the processing module 302 comprises:

a processing unit for performing morphological processing on the first depth image and the second depth image;

the morphological processing comprises denoising the first depth image and the second depth image by image erosion and filtering.

Optionally, as shown in FIG. 6, the matching module 303 comprises:

a first calculation unit 3031 for acquiring a time difference between the first depth image and the second depth image, and calculating a traveling distance of the conveyor belt according to the time difference and the preset initial traversal speed;

a second calculation unit 3032 for calculating a value of a vertical height between a first position represented by the current pixel point and a camera mirror of the TOF depth camera according to the first depth value of the current pixel point, and calculating an actual distance represented by each pixel under the vertical height of the current pixel point according to the value of the vertical height and a half-viewing angle of the TOF depth camera along a direction of the conveyor belt;

a third calculation unit 3033 for calculating a number of pixel points that the current pixel point should advance in the second depth image after the time difference according to the traveling distance and the actual distance;

a selection unit 3034 for selecting the current pixel point and the eight pixel points around the current pixel point, and finding the target pixel point corresponding to the current pixel point and eight pixel points around the target pixel point in the second depth image according to the number of the pixel points.

Optionally, as shown in FIG. 6, the matching module 303 further comprises:

a matching unit 3035 for matching the first depth value of the current pixel point with the second depth value of the target pixel point;

a first weighting unit 3036 for, if an absolute value of a difference between the first depth value and the second depth value is greater than or equal to a first preset threshold, the current pixel point matching fails and if a first height of the first position represented by the current pixel point that fails to match is higher than a second height of a second position represented by the target pixel point, acquiring a single pixel similarity value of the current pixel point, and adding the single pixel similarity value to the total similarity value.

a second weighting unit 3037 for, if the absolute value of the difference between the first depth value and the second depth value is less than the first preset threshold, the current pixel point is successfully matched, perform a weighting process to obtain a single pixel similarity value, and adding the single pixel similarity value to the total similarity value.

The working principle of the volumetric measuring apparatus based on the TOF depth camera provided by the embodiment of the present application is as follows: the acquisition module 301 acquires the depth images returned by the TOF depth camera, wherein the depth images comprises the first depth image and the second depth image which are adjacent; the processing module 302 denoises the first depth image and the second depth image; the matching module 303 is used for selecting the first feature area of the denoised first depth image and the second feature area of the denoised second depth image respectively, traversing each pixel point in the first feature area at multiple traversal speeds, and matching the first depth value of the current pixel point with the second depth value of the target pixel point corresponding to the current pixel point in the second feature area to acquire multiple total similarity values; the determination module 304 determines the traversal speed corresponding to the maximum total similarity value among the multiple the total similarity values as the instantaneous speed at the current moment; the calculation module 305 calculates the package volume according to the instantaneous speed.

Figure 8:
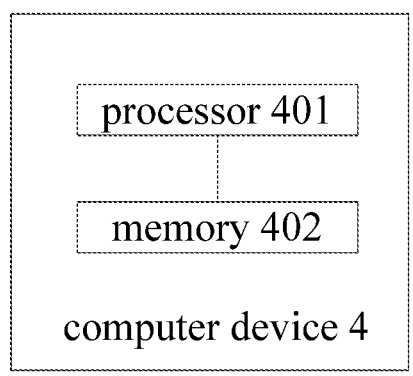
FIG. 8 is a schematic structural diagram of a computer device provided by an embodiment of the present application.

As shown in FIG. 8, an embodiment of the present application provides a computer device 4, which comprises a processor 401 and a memory 402 connected with the processor 401;

the memory 402 is configured to store a computer program which is to execute the following steps:

acquiring depth images returned by the TOF depth camera; the depth images comprises a first depth image and a second depth image which are adjacent to each other;

denoising the first depth image and the second depth image;

selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

determining a traversal speed corresponding to a maximum total similarity value among the multiple total similarity values as an instantaneous speed at a current moment;

calculating a package volume according to the instantaneous speed;

the processor 401 is configured to call and execute the computer program in the memory.

An embodiment of the present application provides a computer storage medium on which a computer program is stored, and when the computer program is executed by a processor, implements the following steps:

acquiring depth images returned by the TOF depth camera; the depth images comprise a first depth image and a second depth image which are adjacent to each other;

denoising the first depth image and the second depth image;

selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

determining a traversal speed corresponding to a maximum total similarity value among the multiple total similarity values as an instantaneous speed at a current moment;

calculating a package volume according to the instantaneous speed.

To sum up, the present application provides a volumetric measuring method and apparatus based on a TOF depth camera, comprising: acquiring depth images returned by the TOF depth camera; denoising the first depth image and the second depth image; selecting a first feature area of the first depth image and a second feature area of the second depth image that have been denoised respectively, traversing each pixel point in the first feature area at multiple traversal speeds, and matching a first depth value of the current pixel point with a second depth value of a target pixel point corresponding to the current pixel point in the second feature area to acquire multiple total similarity values; determining a traversal speed corresponding to a maximum total similarity value among the multiple total similarity values as an instantaneous speed at a current moment; calculating a package volume according to the instantaneous speed. The present application effectively solves the problem that an accurate package volume cannot be obtained when the speed of the conveyor belt is not fixed due to turning-on, turning-off, unstable voltage, manual intervention and the like, and can make the package volume calculation more accurate, and the method is accurate and effective in measurement, and high in feasibility.

It can be understood that the aforementioned method embodiment corresponds to the above-mentioned apparatus embodiment, and the corresponding specific contents can refer to each other, and are omitted here.

It will be appreciated by those skilled in the art that the embodiment of the present application can be provided as a method, a system, or a computer program product. Therefore, the present application can take the form of an entirely hardware embodiment, an entirely software embodiment or an embodiment combining software and hardware aspects. Furthermore, the present application can take the form of a computer program product implemented on one or more computer usable storage media (including but not limited to magnetic disk memory, optical memory, etc.) having computer usable program codes embodied therein.

The present application is described with reference to the flowcharts and/or block diagrams of the method, the device (system), and the computer program products according to embodiments of the present application. It should be understood that each flow and/or block in the flowcharts and/or block diagrams, as well as combinations of flows and/or blocks in the flowcharts and/or block diagrams can be implemented by computer program instructions. These computer program instructions can be provided to the processor of a general-purpose computer, a special-purpose computer, an embedded processor or other programmable data processing device to produce a machine, so that the instructions executed by the processor of the computer or other programmable data processing device produce a means for implementing the functions specified in one or more flows of the flowcharts and/or one or more blocks of the block diagrams.

These computer program instructions can also be stored in a computer-readable memory that can guide a computer or other programmable data processing device to work in a specific way, so that the instructions stored in the computer-readable memory produce an article of manufacture including instruction methods that implement the functions specified in one or more flows of the flowcharts and/or one or more blocks of the block diagrams.

These computer program instructions can also be loaded onto a computer or other programmable data processing device, so that a series of operation steps are executed on the computer or other programmable device to generate computer-implemented processing, and thus the instructions executed on the computer or other programmable device provide steps for implementing functions specified in one or more flows of the flowcharts and/or one or more blocks of the block diagrams.

The above descriptions are only specific embodiments of the present application, but the scope of protection of the present application is not limited thereto, and any changes or substitutions which can be easily made by a person skilled in the art within the technical scope disclosed in the present application are intended to be within the scope of protection of the present application. Therefore, the scope of protection of the present application shall be subject to the scope of protection of the claims.

The invention claimed is:

1. A volumetric measuring method based on a time-of-flight depth camera, comprising:

acquiring depth images returned by the time-of-flight depth camera; the depth images comprise a first depth image and a second depth image which are adjacent to each other;

denoising the first depth image and the second depth image;

selecting a first feature area of the first depth image and a second feature area of the second depth image that have been denoised respectively, traversing each pixel point in the first feature area at multiple traversal speeds v, and matching a first depth value of a current pixel point with a second depth value of a target pixel point corresponding to the current pixel point in the second feature area to acquire multiple total similarity values;

determining a traversal speed corresponding to a maximum total similarity value among the multiple total similarity values as an instantaneous speed at a current moment;

calculating a package volume according to the instantaneous speed.

2. The method according to claim 1, wherein the "acquiring depth images returned by the time-of-flight depth camera" comprises:

acquiring depth flows by employing the time-of-flight depth camera to shoot a package on a conveyor belt;

converting the depth flows into the depth images;

wherein, the time-of-flight depth camera is arranged above the conveyor belt, and a shooting direction of the time-of-flight depth camera is perpendicular to the conveyor belt.

3. The method according to claim 1, wherein the "denoising the first depth image and the second depth image" comprises:

performing morphological processing on the first depth image and the second depth image;

the morphological processing comprises denoising the first depth image and the second depth image by image erosion and filtering.

4. The method according to claim 1, wherein the "traversing each pixel point in the first feature area at multiple traversal speeds" comprises:

acquiring a time difference between the first depth image and the second depth image, and calculating a traveling distance of the conveyor belt according to the time difference and the preset initial traversal speed;

calculating a value of a vertical height between a first position represented by the current pixel point and a camera mirror of the time-of-flight depth camera according to the first depth value of the current pixel point, and calculating an actual distance represented by each pixel point under the vertical height of the current pixel point according to the value of the vertical height and a half-viewing angle of the time-of-flight depth camera along a direction of the conveyor belt;

calculating a number of pixel points that the current pixel point should advance in the second depth image after the time difference according to the traveling distance and the actual distance;

selecting the current pixel point and eight pixel points around the current pixel point, and finding the target pixel point corresponding to the current pixel point and eight pixel points around the target pixel point in the second depth image according to the number of the pixel points.

5. The method according to claim 4, wherein the "traversing each pixel point in the first feature area at multiple traversal speeds" comprises following specific steps:

1) acquiring the time difference t between the first depth image and the second depth image;

2) setting a traversal speed v from $V_1$ to $V_2$, and a traversal accuracy as r, that is, each traversal increases v by r, when traversing at the traversal speed v:

(1) according to the traversal speed v, calculating the traveling distance x of the conveyor belt based on $x=v*t$;

(2) given a size of each depth image, traversing each pixel point in the first feature area of the first depth image, and when traversing each pixel point:

calculating the vertical height h between the first position represented by the current pixel point and the camera mirror of the time-of-flight depth camera according to depth information of the current pixel point p, and calculating the actual distance represented by each pixel point under the vertical height of the current pixel point according to the half-viewing angle γ of the time-of-flight depth camera along the direction of the conveyor belt:

$$L=(h*\tan(\gamma)*2)/n;$$

where: L is the actual distance represented by each pixel point; h is the vertical height between the first position represented by the current pixel point and the camera mirror; γ is the half-viewing angle; n is the number of pixel points;

calculating, according to the traversal speed v, the number of pixel points Δn=x/L that the pixel point p should advance in the second depth image over t time;

taking the current pixel point and the eight pixel points around the current pixel point, and finding the target pixel point pp corresponding to the current pixel point p and the eight pixel points around the target pixel point pp in the second depth image according to Δn obtained by the current pixel point p.

6. The method according to claim 4, wherein the "matching a first depth value of a current pixel point with a second depth value of a target pixel point corresponding to the current pixel point in the second feature area to acquire multiple total similarity values" comprises:

matching the first depth value of the current pixel point with the second depth value of the target pixel point;

if an absolute value of a difference between the first depth value and the second depth value is greater than or equal to a first preset threshold, the current pixel point matching fails; if a first height of the first position represented by the current pixel point that fails to match is higher than a second height of a second position represented by the target pixel point, acquiring a single pixel similarity value of the current pixel point, and adding the single pixel similarity value to a total similarity value; otherwise, do nothing;

if the absolute value of the difference between the first depth value and the second depth value is less than the first preset threshold, the current pixel point is successfully matched, perform a weighting process to obtain a single pixel similarity value, and adding the single pixel similarity value to the total similarity value.

7. The method according to claim 6, wherein the weighting process comprises:

judging whether the first position represented by the current pixel point is on the package according to a value of the first height of the current pixel point;

if the first position is not on the package, assigning a first weight value;

if the first position is on the package, judging whether the first position represented by the current pixel point and the second position represented by the target pixel point are both on edges of the package by a variance of depth values of the eight pixels around the current pixel point and a variance of depth values of the eight pixels around the target pixel point, respectively;

if any one of the first position and the second position is not on the edges of the package, assigning the first weight value;

if both of the first position and the second position are on the edges of the package, comparing the eight pixel points around the current pixel point and the eight pixel points around the target pixel point correspondingly, wherein when an absolute value of a difference between any pair of eight pairs of pixel points is less than a second preset threshold, this pair of pixel points is successfully matched, and counting a number of successfully matched pairs among the eight pairs of pixel points; setting a first threshold and a second threshold;

when the number of successfully matched pairs is less than or equal to the first threshold, assigning the first weight value;

when the number of successfully matched pairs is greater than the first threshold and less than or equal to the second threshold, assigning a second weight value;

when the number of successfully matched pairs is greater than the second threshold, assigning a third weight value.

8. The method according to claim 7, wherein the first threshold is smaller than the second threshold; the first weight value is smaller than the second weight value, and the second weight value is smaller than the third weight value.

9. A computer device, comprising a processor and a memory connected with the processor;

the memory is configured to store a computer program which is to execute the volumetric measuring method according to claim 1;

the processor is configured to call and execute the computer program in the memory.

10. A volumetric measuring apparatus based on a time-of-flight depth camera, comprising:

an acquisition module for acquiring depth images returned by the time-of-flight depth camera; the depth images comprise a first depth image and a second depth image which are adjacent to each other;

a processing module for denoising the first depth image and the second depth image;

a matching module for selecting a first feature area of the first depth image and a second feature area of the second depth image that have been denoised respectively, traversing each pixel point in the first feature area at multiple traversal speeds, and matching a first depth value of a current pixel point with a second depth value of a target pixel point corresponding to the current pixel point in the second feature area to acquire multiple total similarity values;

a determination module for determining a traversal speed corresponding to a maximum total similarity value among the multiple total similarity values as an instantaneous speed at a current moment;

a calculation module for calculating a package volume according to the instantaneous speed.

11. The apparatus according to claim 10, wherein the matching module comprises:

a first calculation unit for acquiring a time difference between the first depth image and the second depth image, and calculating a traveling distance of the conveyor belt according to the time difference and a preset initial traversal speed;

a second calculation unit for calculating a value of a vertical height between a first position represented by the current pixel point and a camera mirror of the time-of-flight depth camera according to the first depth value of the current pixel point, and calculating an actual distance represented by each pixel under the vertical height of the current pixel point according to the value of the vertical height and a half-viewing angle of the time-of-flight depth camera along a direction of the conveyor belt;

a third calculation unit for calculating a number of pixel points that the current pixel point should advance in the second depth image after the time difference according to the traveling distance and the actual distance;

a selection unit for selecting the current pixel point and eight pixel points around the current pixel point, and finding the target pixel point corresponding to the current pixel point and eight pixel points around the target pixel point in the second depth image according to the number of the pixel points;

a matching unit for matching the first depth value of the current pixel point with the second depth value of the target pixel point;

a first weighting unit for, if an absolute value of a difference between the first depth value and the second depth value is greater than or equal to a first preset threshold, the current pixel point matching fails and if a first height of the first position represented by the current pixel point that fails to match is higher than a second height of a second position represented by the target pixel point, acquiring a single pixel similarity value of the current pixel point, and adding the single pixel similarity value to the total similarity value;

a second weighting unit for, if the absolute value of the difference between the first depth value and the second depth value is less than the first preset threshold, the current pixel point is successfully matched, perform a weighting process to obtain a single pixel similarity value, and adding the single pixel similarity value to the total similarity value.

* * * * *

UNITED STATES PATENT AND TRADEMARK OFFICE
CERTIFICATE OF CORRECTION

PATENT NO. : 11,335,018 B1  
APPLICATION NO. : 17/571400  
DATED : May 17, 2022  
INVENTOR(S) : Weizhong Zhang Page 1 of 1

It is certified that error appears in the above-identified patent and that said Letters Patent is hereby corrected as shown below:

On the Title Page

Item (73) should read as follows:  
(73) Assignee: WEIHAI INNOVATION INSTITUTE, QINGDAO UNIVERSITY, Weihai (CN)  
        QINGDAO UNIVERSITY, Qingdao (CN)  
        QINGDAO POINT CLOUD INTELLIGENT TECHNOLOGY CO., LTD., Qingdao (CN)

Signed and Sealed this  
Twenty-fifth Day of July, 2023

Katherine Kelly Vidal  
*Director of the United States Patent and Trademark Office*